United States Patent [19]

Bucarelli

[11] Patent Number: 4,555,962

[45] Date of Patent: Dec. 3, 1985

[54] MANUALLY ENGAGED AND AUTOMATICALLY DISENGAGED LOCKING DEVICE FOR A VEHICLE DIFFERENTIAL

[75] Inventor: Luciano Bucarelli, Modena, Italy

[73] Assignee: Fiat Trattori S.p.A., Modena, Italy

[21] Appl. No.: 558,793

[22] Filed: Dec. 7, 1983

[30] Foreign Application Priority Data

Dec. 21, 1982 [IT] Italy ................................ 68493 A/82

[51] Int. Cl.[4] ............................................. F16H 1/445
[52] U.S. Cl. ......................................... 74/710.5; 74/713
[58] Field of Search ...................... 74/710, 710.5, 711, 74/713, 477, 483 R, 527

[56] References Cited

U.S. PATENT DOCUMENTS

| | | | |
|---|---|---|---|
| 2,943,501 | 7/1960 | Stapleton | 74/527 X |
| 3,292,720 | 12/1966 | Harvey | 74/710.5 X |
| 3,306,130 | 2/1967 | Salzmann | 74/710.5 |
| 3,400,610 | 9/1968 | Taylor et al. | 74/710.5 |
| 3,640,360 | 2/1972 | Dollase | 74/710.5 X |
| 3,642,103 | 2/1972 | Schott | 74/710.5 X |
| 3,732,752 | 5/1973 | Louckes et al. | 74/710.5 |
| 3,800,617 | 4/1974 | Dornan | 74/527 X |
| 3,974,717 | 8/1976 | Breed et al. | 74/710.5 X |
| 4,263,824 | 4/1981 | Mueller | 74/711 |
| 4,462,271 | 7/1984 | Stieg | 74/710.5 X |

FOREIGN PATENT DOCUMENTS 908540  10/1962  United Kingdom ............... 74/710.5

*Primary Examiner*—Leslie A. Braun
*Assistant Examiner*—Dwight G. Diehl
*Attorney, Agent, or Firm*—Albert L. Jeffers; Anthony Niewyk

[57] ABSTRACT

The device is provided with an engagement pin carried by a differential housing of the differential operable to rigidly angularly interconnect the differential housing with one of the bevel gears of the differential, and an actuator manually controlled by an operator to bring the engagement pin from a rest position to a working position. The device is further provided with a spring for urging the engagement pin towards the rest position, and locking device for releasably locking the engagement pin against the action of the spring; the locking device automatically disengages, and disengaging the engagement pins when the vehicle brake is actuated, there being provided a hydraulic disengagement piston connected to a brake.

12 Claims, 3 Drawing Figures

MANUALLY ENGAGED AND AUTOMATICALLY DISENGAGED LOCKING DEVICE FOR A VEHICLE DIFFERENTIAL

BACKGROUND OF THE INVENTION

The present invention relates to a manually engageable and automatically disengageable locking device for a vehicle differential; in particular, this device is adapted to be used on tractors and other similar vehicles.

As is known, differential locking devices are used predominantly on vehicles intended for off the road use, such as tractors, agricultural machines, military vehicles etc. When operating off the road it is in fact easy, because of the roughness of the ground, for different resistive couples to act on the half-shafts of the vehicle even when running in a straight line; in this case, if the differential is not partially or totally excluded from the transmission it will transmit the major part of the power to the half-shaft experiencing the least resistance with obvious disadvantages on the stability of operation of the vehicle. There are substantially two types of locking devices known. A first type consists of a coupling which rigidly connects a bevel gear of the differential with the differential housing. The coupling is manually controlled by the operator by means of mechanical transmissions, both for engagement and disengagement. A second type consists of a series of friction devices mounted between the differential housing and the bevel gears, which allow a part of the drive couple to be transmitted directly from one to the others without passing through the differential pinions or satellite gears of the differential (limited slip differential).

The devices described are not entirely free from disadvantages. The friction locking devices, which when coupled to the differential give rise to the so-called "limited slip differentials", do not provide a complete locking of the differential and therefore are of less effectiveness. Moreover, these are strongly stressed during operation and consequently wear rapidly. Finally they are of complex and expensive construction. On the other hand the manually engaged locking devices do provide a total and effective locking of the differential, but present the disadvantage of having to be manually disengaged by the operator which makes driving the vehicle difficult when off the road. In fact, the operator must disengage the locking device before the vehicle can turn a bend, and then re-engage it after the bend. Therefore, in the case of rapid maneuvering, the operator often does not have time to disengage the locking and this can cause accidents and/or significant inconveniences in operation; similar inconveniences can cause an erroneous maneuver by the operator who disengages the locking of the differential before time.

SUMMARY OF THE INVENTION

The object of the present invention is to provide a locking device for a vehicle differential, of the manually controlled engagement type, which will be automatically disengaged. A further object of the present invention is to provide a device of the said type which will disengage following activation of a vehicle brake.

The said objects are achieved by the present invention in that it relates to a locking device for a vehicle differential, comprising engagement means for rigidly angularly coupling a bevel gear of the said differential with a differential housing thereof, the said engagement means being carried by the said differential housing, and actuating means for actuating the said engagement means, controlled manually by an operator, for moving the said engagement means from a rest position in which it does not cooperate with the said bevel gear, to a working position in which it cooperates with the said bevel gear to rigidly angularly connect it to the said differential housing, characterised by the fact that it includes resilient means for pressing the said engagement means towards the said rest position, and locking means for releasably locking the said engagement means in the said working position against the action of the said resilient means, the said locking means being operable automatically to disengage when at least one brake of the said vehicle is actuated, including hydraulic disengagement means connected with at least one brake pipe.

BRIEF DESCRIPTION OF THE DRAWINGS

For a better understanding of the present invention there will now be given a non limitative description of an embodiment with reference to the attached drawings, in which.

DETAILED DESCRIPTION OF THE INVENTION

Figure 1:
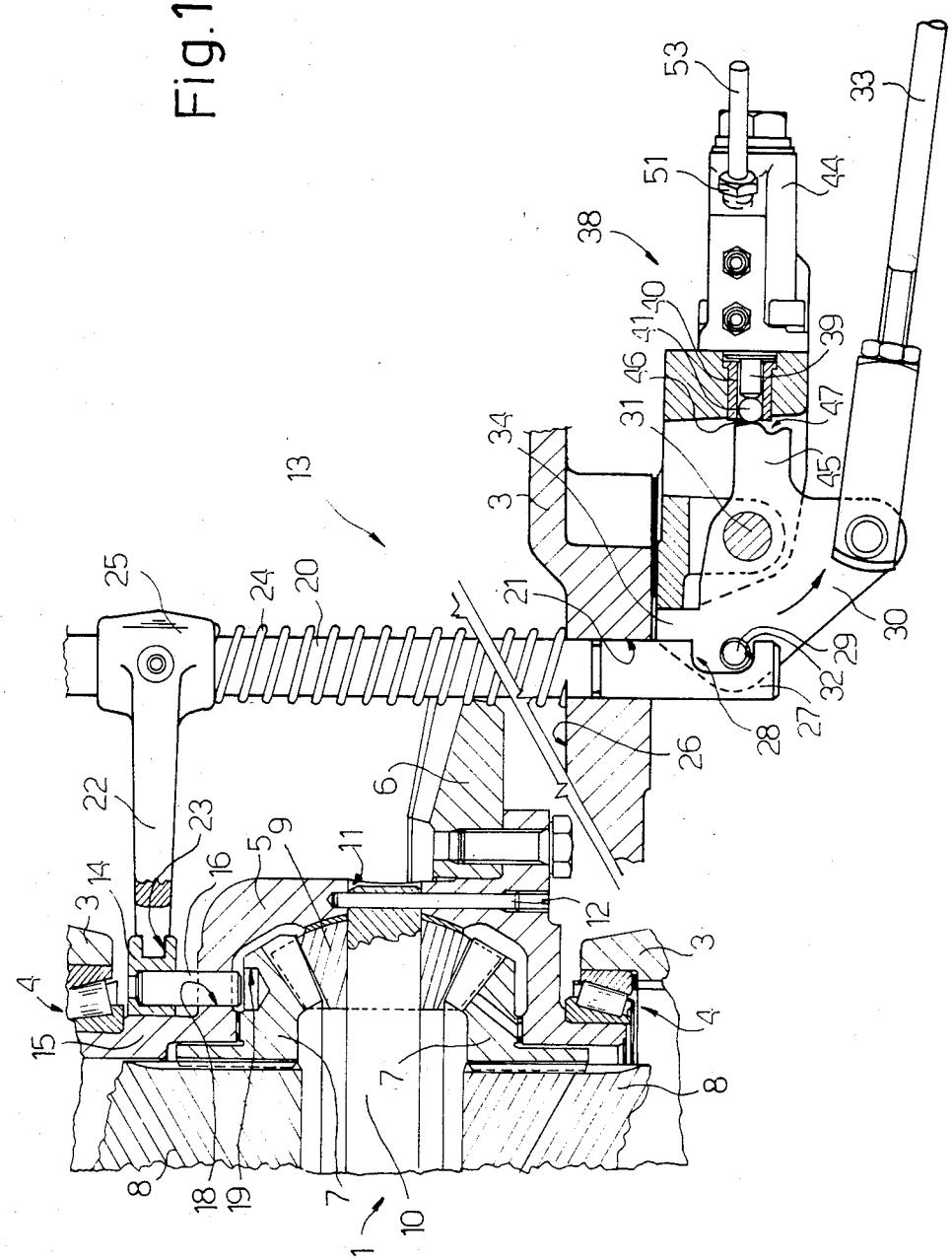
FIG. 1 illustrates a sectioned portion of a differential of a vehicle, provided with a locking device formed according to the principles of the present invention.
Figure 2:
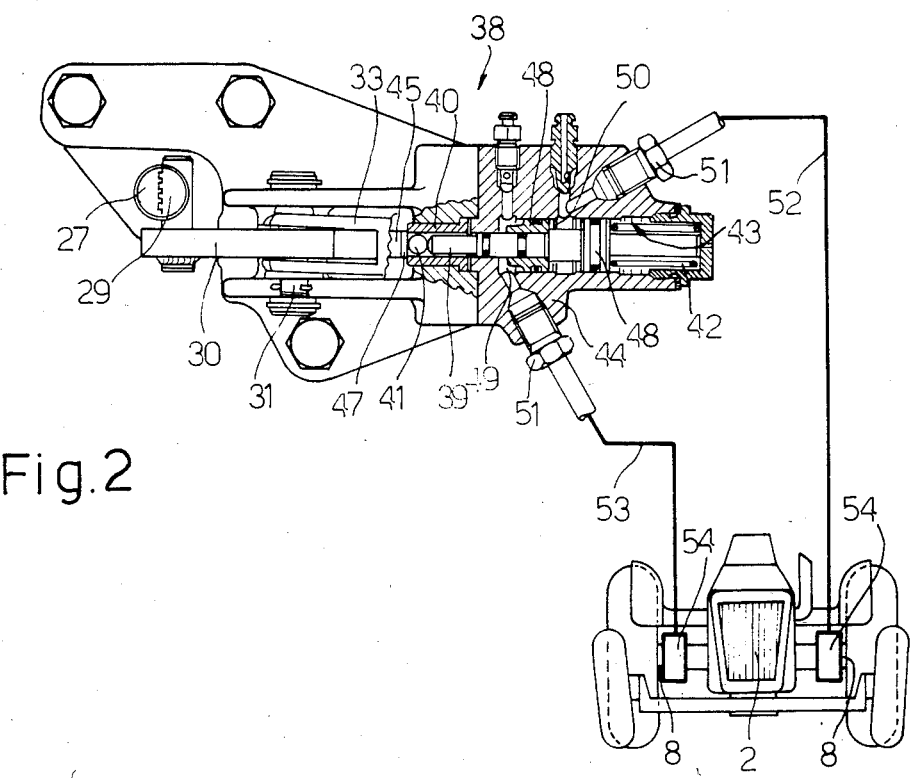
FIG. 2 illustrates a detail of the device of FIG. 1 with schematic indications of the hydraulic connections to a vehicle, illustrated in a schematic form and on an enlarged scale.

With reference to FIG. 1 the reference numeral 1 generally indicates a differential of a vehicle 2, for example a tractor, schematically indicated in reduced scale by the thin lines in FIG. 2. The differential 1 is supported by a chassis 3 of the vehicle 2 by means of bearings 4 and includes a differential housing 5 to which is rigidly connected a crown wheel 6 which receives drive from a pinion not illustrated. Two bevel gears 7 opposite one another are mounted freely rotatably on the differential housing 5 and are rigidly angularly connected each to a respective half-shaft 8 of the vehicle 2, and a plurality of bevel pinions 9, constituting satellite or planet gears (of which only one is illustrated) freely mounted on shaft 10 perpendicular to the half-shaft 8 and rigidly angularly fixed to the differential housing 5 in seats 11 thereof by means of pins 12.

The differential 1 is provided with a locking device generally indicated 13 and including a frontal coupling sleeve 14 slidably mounted on a portion 15 of the differential housing 5 coaxial with the bevel gears 7, and mechanical actuating means mounted on the chassis 3. The sleeve 14 is provided with at least one pin 16, (preferably the sleeve 14 carries a plurality of pins) parallel to the axis of the half-shafts 8 and operable to engage respective corresponding holes 18 and 19 of the differential casing 5 and one of the bevel gears 7 to rigidly angularly interconnect this latter to the differential housing 5 and thus lock the differential 1. The sleeve 14 is therefore movable on the differential housing 5 between a rest position, illustrated in FIG. 1, in which the pins 16 engage only the through holes 18 of the differential housing 5 leaving the corresponding bevel gears 7 free to rotate at a different speed from that of the differential housing 5, and a working position, not illustrated, displaced towards the bevel gears 7 parallel to the half-shafts 8, in which the pins 16 also engage also the blind holes 19 of one of the bevel gears 7. In this position of the sleeve 14 the differential 1 is locked and behaves, as is known, as a rigid coupling which connects the two half-shafts 8 constraining them to turn at the same speed in any load conditions.

However, when the sleeve 14 is in the rest position of FIG. 1 it does not cooperate with the bevel gear 7 and does not interfere with the normal operation of the differential 1, which will not be described here as it is widely known.

The movement of the sleeve 14 from the rest position to the working position is controlled by the translation along its axis of a shaft 20 slidably mounted in a hole 21 of the chassis 3 and provided with a transmission arm 22 which cooperates slidingly with an annular seat 23 of the sleeve 14. In this way the sleeve 14 is free to rotate together with the differential housing 5, with respect to the chassis 3, whilst the arm 22 does not turn with respect to the chassis 3 and can translate together with the shaft 20 parallel to the axis of the half-shaft 8, carrying the sleeve 14 with it into the working position. Mounted coaxially on the shaft 20 there is a helical spring 24, preferably pre-loaded to a predetermined value, and located between two opposite shoulders constituted by a sleeve 25 rigidly connected to the shaft 20 and carrying the arm 22 and by a surface 26 of the chassis 3 surrounding the hole 21. In this way the spring 24 opposes translational movement of the shaft 20 and consequently the movement of the sleeve 14 towards the working position.

At one end 27 the shaft 20 is provided with a longitudinal recess 28 engaged by a pin 29 rigidly connected to a transmission lever 30 turning coaxially about a pin 31 rigidly mounted on the chassis 3. The pin 29 is mounted in correspondence with an apex of the lever 30, which has a substantially triangular form, eccentrically of the pin 31, and is operable to cooperate with a shoulder surface 32 of the recess 28 to displace the shaft 20 against the action of the spring 24 when the lever 30 is made to turn about the pin 31 in a predetermined direction as shown by the arrow, by means of operation of a control rod 33 pivotally connected to the lever 30 eccentrically of the pin 31 at an opposite apex of the lever 30.

This lever 30, which is therefore connected mechanically in an articulated manner to the shaft 20, is provided with an end-of-stroke shoulder 34 which limits the rotation thereof in a direction contrary to that of the arrow of FIG. 1, thus permitting the pin 29 to serve as an end-of-stroke abutment for the shaft 20 and prevent this latter from coming out of the hole 21 by the action of the spring 24.

Figure 3:
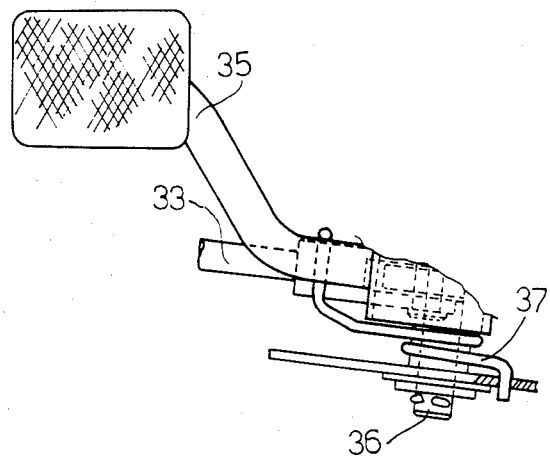
FIG. 3 illustrates a further detail of the device of FIG. 1, not visible in this latter.

The control rod 33, which is adjustable in length to compensate for possible play, is controlled by a pedal 35 (FIG. 3) which can be operated by the vehicle driver to rotate about a pin 36 against the action of a biasing spring 37. By acting on the pedal 35 the control rod 33 is pulled against the action of the spring 37 causing the lever 30 to turn in the direction of the arrow from a non rotated or rest position, illustrated in FIG. 1, to a rotated position not illustrated, in which the shaft 20 is translated by a distance such as to cause insertion of the pins 16 into the holes 19 against the action of the spring 24 and consequently to lock the differential 1.

To maintain this locking even when the action on the pedal 35 has ceased, the device 13 is provided with locking means 38, illustrated in detail in FIG. 2, which oppose the biasing action of the springs 24 and 37. The means 38 includes a finger 39 movable within a bush 40 between a retracted position illustrated in FIGS. 1 and 2 and an extended position, not illustrated, in which it presses a locking ball 41 partially out from the bush 40, and a spring 42 operable to press the finger 39 towards the extended position and lodged in a seat 43 of a box 44 fixed to the chassis 3. The finger 39 cooperates, through the interposed ball 41, with a portion 45 of the lever 30, which is provided with a surface 46 operable to cooperate with the ball 41 to maintain the finger 39 in the retracted position against the action of the spring 42 when the lever 30 is in the non rotated position; the portion 45 is also provided with a seat 47 which can be snap-engaged by the ball 41 and the associated finger 39, pressed by the spring 42 into the extended position, when the lever 30 is turned in the direction of the arrow, in such a way as to lock the lever 30 into the rotated position in which the shaft 20 maintains the sleeve 14 in the working position against the action of the spring 24.

In the seat 43 there are also slidably housed two pistons 48 coaxial with one another and rigidly connected to the finger 39, which delimit therein two cylindrical sealed pressure chambers 49 and 50 connected by means of unions 51 to two respective pipes 52 and 53 hydraulically connected to the braking installation of the vehicle 2. Preferably the vehicle 2 is of the type having independent braking systems 54, on each half-shaft 8, in such a way as to be able to brake the half-shafts 8 independently from one another, and the pipes 52 and 53 are each connected to a respective system 54.

In use, when the vehicle 2 starts to travel off the road, the driver locks the differential 1 by engaging the device 13. For this purpose it is sufficient to act on the pedal 35 and, through the mechanical drive chain formed by the control rod 33, lever 30, shaft 20 and arm 22 this causes translation of the sleeve 14 into working position and the introduction of the pins 16 into the holes 19 and simultaneously stresses the springs 24 and 37. When the seat 47 arrives in correspondence with the ball 41 the finger 39 snaps out pressed by the spring 42 and locks the movement of the whole mechanism 13 in that it prevents any rotation of the lever 30. In this way the pedal 35 and the sleeve 14 remain locked in the working position even when the operator stops pressing on the pedal 35. The locking of the pedal 35 further provides the operator with an indication that the device 13 is engaged.

When the vehicle 2 must start turning in a curve, during which it is necessary to release the differential 1, the operator acts on one or both brakes 54 (preferably the vehicle 2 is steered exclusively, or in part, by braking one of the wheels, similar to track laying vehicles). Consequently one (or both) chambers 49 and 50, connected to the brakes 54, is put under pressure causing the translation of the pistons 48 and the finger 39 rigidly connected to them towards the retracted position overcoming the resistance of the spring 42. Therefore the ball 41 disengages from the seat 47 and the lever 30 is allowed to turn freely under the biasing action of the spring 37 to move back into the position of FIG. 1. The spring 24 does not exert any action on the lever 30 in that the shaft 20 is still locked after the disengagement of the means 38 because of the pins 16, which, notwithstanding the action of the spring 24, cannot become disengaged from the holes 19 because of the friction due to the drive transmission. With the differential 1 locked, in fact, the drive transmission between the differential housing 5 and the bevel gears 7 takes place entirely through the pins 16, which consequently exercise a high pressure on the wall of the holes 18 and 19 which is converted into a high component of friction which opposes disengagement.

To allow the rotation of the lever 30, under the action of only the spring 37, the cavity 28 must therefore be of high longitudinal dimension such as to allow the pin 29 within it to move back into the position of FIG. 1 when the shaft 20 is in the displaced position locking the differential 1.

When the vehicle 2 starts to turn, the differential 1 automatically unlocks as soon as it is necessary. In fact, when the resisting couple on one of the half-shafts 8 becomes different from that acting on the other half-shaft and therefore from the drive couple acting on the differential housing 5 (in that one of the wheels of the vehicle loses or increases its grip, for example because of the different distance which the wheel on the inside of the curve must travel with respect to the outer wheel) this latter tends to pass from being a drive element to being a driven element with respect to the bevel gears 7. During this conversion, therefore, the couple transmitted through the pins 16 momentarily becomes nil thereby nullifying the frictional forces which retain the pins 16 in the holes 19 and thus permitting the spring 24 to bias the shaft 20, no longer retained by the lever 30 in that this has already displaced upon disengagement of the means 38, and therefore to move back the sleeve 40 into the rest position unlocking the differential 1.

The advantages of the device described are apparent. It allows the differential of the vehicle to be completely locked immediately upon control by the driver and automatically releases only at the appropriate moment, thereby compensating possible erroneous maneuvers by the operator. In fact, if the operator also acts on the brakes 54 disengaging the locking means 38 and then continues to drive in a straight line, the differential 1 continues to remain locked because of the friction on the pins 16. Only during a curve, when conditions requiring the intervention of the differential are established, is this released in that the loads on the pins 16 are momentarily annulled, and it commences to operate normally. Finally, during rapid and/or emergency movements, in which it is necessary to use the brakes and steer sharply, the differential 1 releases rapidly and automatically without requiring a particular operation by the driver.

I claim:

1. A locking device (13) for a differential (1) of a vehicle (2) comprising engagement means (14, 16) for rigidly angularly connecting a bevel gear (7) of the differential (1) with a differential housing (5) thereof, said engagement means (14, 16) being carried by said differential housing (5), and actuating linkage means (20, 30, 33) for operating said engagement means, said actuating linkage manually controlled by an operator, and operable for moving said engagement means (14, 16) from a rest position in which said engagement means is not engaged with said bevel gear (7), to a working position in which said engagement means is engaged with said bevel gear (7) to rigidly interconnect said bevel gear with said differential housing (5) and in which said housing drives said bevel gear, characterised by the fact that said linkage means includes resilient means (24) for urging said engagement means (14, 16) towards said rest position, and locking means (38) for releasably locking said engagement means (14, 16) in said working position against the urging action of said resilient means (24), said locking means comprising a finger (38), which is positively actuated by hydraulic means (48) to retract and unlock said engagement means (14, 16), said hydraulic means operatively connected to at least one brake line of the vehicle brakes, said locking means (38, 39) being released automatically when a brake (54) of said vehicle which is connected to said one brake line (2) is actuated, said engagement means (14, 16) remaining in said working position after release of said locking means (38, 39) until said housing (5) ceases to drive said bevel gear (7) whereupon said engagement means (14, 16) moves to said rest position by the action of said resilient means.

2. A device (13) according to claim 1, wherein said engagement means includes a sleeve (14) slidably mounted on said differential housing (5), coaxial with said bevel gear (7) and provided with at least one pin (16) operable to engage corresponding holes (18, 19) formed in said differential housing (5) and in said bevel gear (7) to transmit driving forces from said bevel gear to said housing and vice versa, whereby said bevel gear (7) and said differential housing (5) rotate at the same speed.

3. A device (13) according to claim 1, characterised by the fact that the said actuating linkage means includes a transmission lever (30) rotatably mounted on a pin (31), a control rod (33) pivotally connected to said lever (30) to rotate said lever (30) in a predetermined direction, and an axially movable shaft (20) connected to said lever (30) radially outwardly of said pin (31), for axial movement upon rotation of said lever (30) in said predetermined direction, said shaft (20) connected to said engagement means (14, 16) for displacing said engagement means from said rest position to said working position.

4. A device (13) according to claim 3, wherein said resilient means comprises a spring (24) coaxially mounted on said shaft (20) and operable to oppose axial movement thereof to displace said engagement means from said rest position to said working position.

5. A device (13) according to claim 3, wherein said engagement means comprises a sleeve (14) and said shaft (20) carries an arm (22) which cooperates with an annular seat (23) of said sleeve (14) for moving said sleeve coaxially with said bevel gear (7) in response to axial movement of said shaft (20).

6. A device (13) according to claim 3, wherein said actuating linkage means further includes manual control means (35) operable against the biasing action of a spring (37) to actuate said control rod (33).

7. A device (13) according to claim 3, wherein said shaft (20) is connected to said transmission lever (30) by an elongated recess (28) formed in an end (27) of said shaft (20), said recess engaged by a pin (29) rigidly connected to said lever (30), said recess (28) having a shoulder surface (32) operatively associated with said pin (29) for axially moving said shaft (20) when said lever (30) is rotated, said recess enabling the return of said lever (30) to a non rotated position whilst said shaft (20) maintains a position in which said engagement means (14) is displaced in said working position.

8. A device (13) according to Claim 1, wherein said locking means (38) comprises a finger (39) movable between an extended position in which it locks said engagement means (14, 16) in said working position, and a retracted position wherein said engagement means is being urged by said resilient means toward said rest position, and a spring (42) for urging said finger (39) towards said extended position.

9. A device (13) according to claim 8, wherein said hydraulic means comprises at least one piston (48) slidable in a cylindrical chamber (49, 50) and mechanically connected to said finger (39), to urge said finger towards said retracted position against the urging action of said spring (42), said chamber (49, 50) being sealed and hydraulically connected to said brake pipe (52, 53) of a brake (54), said chamber being pressurized upon operation of said brake.

10. A device according to claim 8, wherein said actuating linkage means includes a transmission lever and a control rod for rotating said lever, said transmission lever (30) including a surface portion (46) operable in a first position of said lever to maintain said finger (39) in said retracted position said lever also including a seat (47) operable in a second position of said lever for engaging said finger (39) in said extended position and locking said lever in said second position, when said lever (30) is rotated by said control rod (33) to move said engagement means (14) into said working position, said extended finger maintaining said engagement means (14) displaced in said working position against the urging action of said resilient means (24).

11. A device (13) according to claim 1, wherein said locking means (38) operates directly on said actuating linkage means (30).

12. An agricultural tractor, including a differential (1), and a locking device (13) for the differential (1) said locking device comprising engagement means (14, 16) for rigidly connecting a bevel gear (7) with a differential housing (5), said engagement means (14, 16) being carried by said differential housing (5) manually operated actuating means (20, 30, 33) for actuating said engagement means and for moving said engagement means (14, 16) from a rest position in which it does not cooperate with said bevel gear (7) to a working position in which it rigidly interconnects said differential housing (5) with said bevel gear (7) for driving said bevel gear (7), resilient means (24) for urging said engagement means (14, 16) toward said rest position and locking means (38, 39) ror releasably locking said engagement means (14, 16) in said working position against said urging action of said resilient means (24), said locking means (38, 39) comprising a finger (38), which is positively actuated by (14, 16), said hydraulic means operatively connected to at least one brake line of the vehicle brakes, said locking means (38, 39) being released automatically when at least one brake (54) of said vehicle (2) is actuated, said engagement means (14, 16) remaining in said working position after release of said locking means (38, 39) until said housing (5) ceases to drive said bevel gear (7) whereupon said engagement means (14, 16) moves to said rest position.

* * * * *